United States Patent Office 3,051,433
Patented Aug. 28, 1962

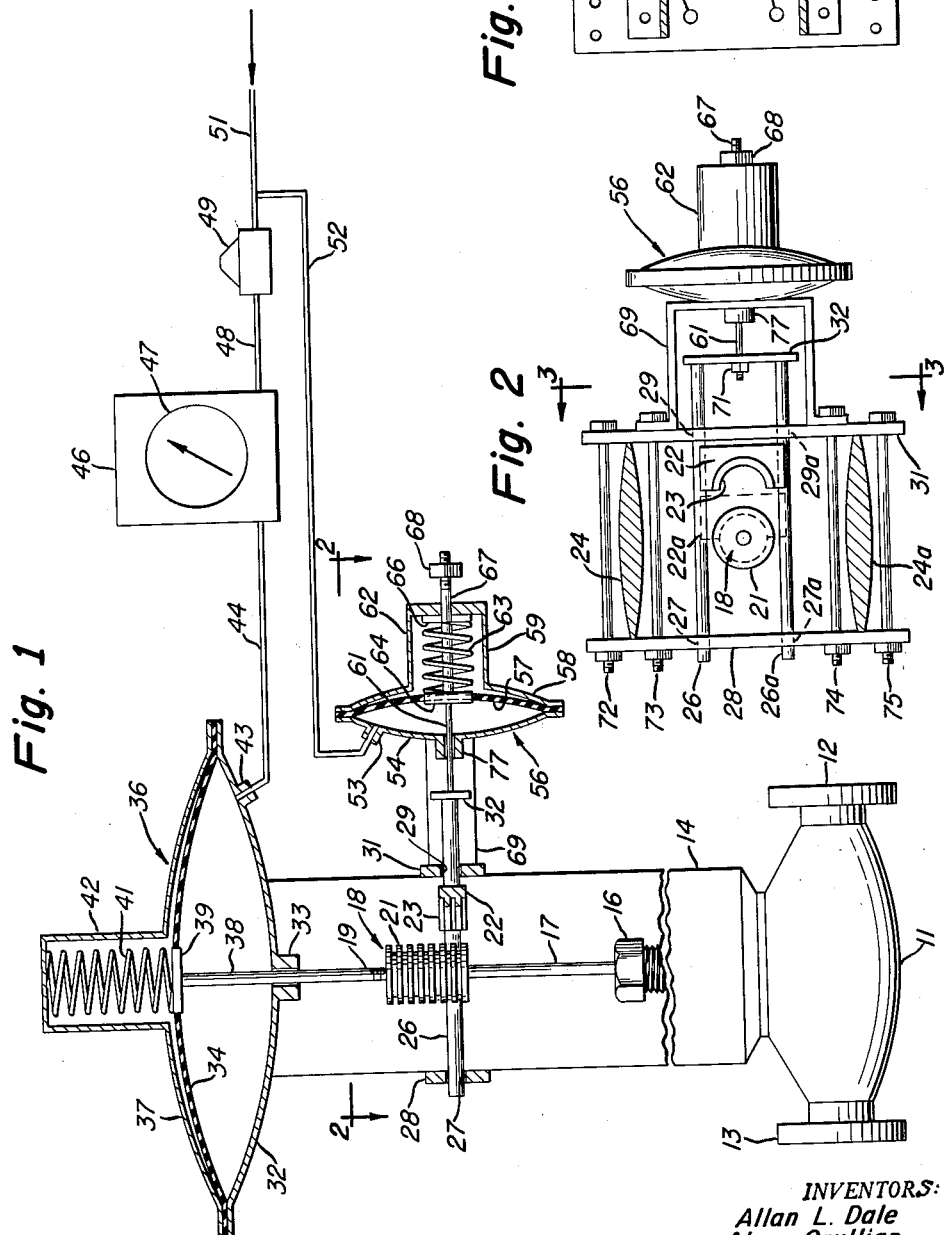

3,051,433
CONTROL VALVE LOCKING APPARATUS
Allan L. Dale and Alma Orullian, Salt Lake City, Utah, and Bill J. Pope, Abadan, Iran, assignors, by mesne assignments, to Standard Oil Company, Chicago, Ill., a corporation of Indiana
Filed Dec. 10, 1959, Ser. No. 858,622
1 Claim. (Cl. 251—61)

This invention relates to control valves, and more particularly applies to means for locking a fluid-operated control valve in its pre-failure position upon failure of the fluid supply pressure.

Fluid-operated control valves are throttling type valves whose position is controlled by the application of fluid pressure to a valve stem actuating mechanism such as a diaphragm, a bellows, or the like. The majority of such valves are of the diaphragm-and-spring type, where a spring normally urges the valve stem in one direction while the control fluid pressure opposes this action and tends to move the stem in the opposite direction. Air is usually the motive fluid.

Because of this spring action, control valves are constructed to open fully or close fully upon a failure of control fluid pressure. As a safety measure, control valves are specified which will "fail safe" upon failure of the control fluid pressure. Thus, most process designers require control valves to fail in such manner as to hold pressures, hold levels, and cool equipment should the controlling fluid supply be interrupted.

In many processes, however, control valves which open fully or close fully upon fluid (e.g. air) pressure failure do not provide adequate safety. Thus, in the hydroforming of petroleum naphthas over a platinum catalyst and in the presence of hydrogen gas, it is important that the ratio of naphtha fed to hydrogen gas be maintained within rather narrow limits. Too high a feed rate—as would occur if the naphtha feed control valve opened wide on air failure—would result in the deposition of large amounts of coke on the platinum catalyst. On the other hand, if this valve closed completely on air failure then only hydrogen gas would flow through the reactor preheaters and as a consequence would be overheated and sinter the catalyst.

Accordingly, a primary object of the present invention is to provide means for locking a control valve in position in the event of controlled fluid pressure failure, and to hold the valve in this position until control fluid pressure is restored. A further object is to provide a valve stem locking mechanism which is simple, rugged, and foolproof. An additional object is to provide a valve locking mechanism which is capable of locking a control valve in its pre-failure position and which operates independent of check valves and the like. Other and more particular objects will become apparent as the description of this invention proceeds.

Briefly, and in accordance with the invention, we provide a locking device for fluid operated control valves which is actuated by the fluid pressure which is supplied to the controller that in turn actuates the control valve itself. Thus failure of fluid pressure in the supply line to a controller mechanism will operate the locking apparatus and lock the control valve stem before the stem moves as a result of fluid pressure failure.

In the preferred embodiment, the locking device comprises a toothed yoke which engages similar teeth on a collar affixed to the control valve stem. The yoke is connected to an air-operated diaphragm. A spring acting on the diaphragm opposes the applied air pressure and tends to move the yoke into locking engagement with the collar. As long as sufficient air pressure is maintained on the diaphragm to overcome the spring pressure, the yoke remains clear of the collar. However, should this air pressure be interrupted as a result of air supply line failure, the spring moves the yoke into engagement with the collar before the collar and its attached valve stem have an opportunity to alter their position. The stem remains locked in position until return of air supply pressure to the locking apparatus diaphragm withdraws the yoke, at which time control air pressure is available to position the stem in normal manner.

The invention will be described in further detail in the ensuing specification when read in conjunction with the attached drawing wherein:

FIGURE 1 is an elevation, partly in section, showing the valve locking device connected to a diaphragm-and-spring valve;

FIGURE 2 is a partial top view of the inventive locking apparatus and illustrates its position before and during control fluid pressure failure; and FIGURE 3 is a partial side view of a bracket suitable for attaching the locking device to a fluid-operated control valve.

Turning first to FIGURE 1, the inventive locking device is shown affixed to a conventional diaphragm-and-spring valve which comprises valve body 11, flanges 12 and 13, bonnet 14, control valve stem 17, and diaphragm chamber 36. Diaphragm chamber 36 may comprise a pair of ellipsoidal sections 32 and 37 separated by a flexible diaphragm 34 of reinforced rubber or the like. Plate 39 is attached to diaphragm 34. A spring 41, contained within housing 42 exerts pressure on plate 39 and forces shaft 38 in one direction, usually toward valve body 11. Shaft 38 passes through gland 33 and is threaded at portion 19 to receive a toothed cylindrical collar 18. Valve stem 17 is an extension of shaft 38 and passes through gland 16 and bonnet 14 into one or more plugs (not shown) in valve body 11.

A pair of legs 24, and 24a one on each side of the valve, rigidly positions diaphragm chamber 36 above valve body 11.

A port 43 in the lower half of diaphragm chamber 36 connects via conduit 44 to a controller 46. Controller 46, which may include an indicator 47, receives supply air from conduit 48 and in turn furnishes control air via conduit 44 to diaphragm chamber 36 in response to a process deviation. Controller 46 may be responsive to, for example, a stream pressure, temperature, level, flow-rate, or the like or may be a transducer which delivers a controlled output air pressure in response to an input electrical or mechanical signal. Alternatively, controller 46 may be a valve positioning mechanism, which is located near the control valve and delivers an output pressure to adjust the position of shaft 38 in response to an input air pressure signal.

The supply air to controller 46 is, as noted previously, furnished from conduit 48. An air pressure regulator 49 may optionally be disposed in conduit 48 to reduce the air supply pressure of conduit 51 which is normally in excess of about 50 p.s.i.g. to a value of approximately 20–25 p.s.i.g. The output pressure from controller 46 is conventionally in the range of three to fifteen p.s.i.g.

In the air supply to controller 46, either upstream (conduit 51) or downstream (conduit 48) of air pressure regulator 49, a conduit 52 is connected. Conduit 52 communicates via port 53 with diaphragm chamber 56 in the inventive valve locking apparatus.

The present valve locking device may comprise a diaphragm chamber 56 located between two ellipsoidal segments 54 and 58, a yoke member 22 having teeth 23 adapted to engage similar teeth on collar 18 and a spring 63 normally urging the yoke member 22 into such engagement. This spring action is opposed by air pressure in diaphragm chamber 56.

The valve stem locking apparatus is attached to the legs 24 and 24a of the control valve by means of brackets 28 and 31. These brackets respectively have guide-rod-receiving ports 27 and 27a and 29 and 29a, through which pass guide rods illustrated by rod 26. These guide rods carry yoke member 22 in a path normal to the control valve stem 17 and distribute vertical stresses to brackets 28 and 31. Guide rod 26 is connected to bar 32 which in turn is connected to shaft 61. Shaft 61 passes through gland 77 and into diaphragm chamber 56 where it is attached to plate 64 on diaphragm 57. Plate 64 contacts spring 63, which is disposed within housing 59; an extension of shaft 61, i.e. shaft 67, passes through the outermost end of housing 59 and is equipped with adjustable threaded nut 68 to limit the position of yoke member 22.

Turning now to FIGURE 2, a partial top view of the valve locking apparatus is shown. Brackets 28 and 31 are secured to legs 24 and 24a by a series of tie bolts 72, 73, 74 and 75. Guide rods 26 and 26a pass through ports, illustrated by ports 27 and 29, and are attached to yoke member 22.

As may be seen from FIGURE 2, yoke member 22 has a semi-cylindrical recess which matches the shape of cylindrical collar 18. Teeth 23 on yoke member 22 engage a corresponding set of teeth 21 on collar 18; these teeth may be of any suitable size consistent with substantial maintenance of the original valve stem position on control air failure. Teeth 21 and 23 preferably have flat bearing surfaces, and may be either square, buttress, or V in cross section.

Guides 26 and 26a are connected to bar 32, which in turn is attached to shaft 61 by means of threaded nut 71. Upon termination of air pressure to diaphragm chamber 56, yoke member 22 assumes the position 22a shown in dotted lines.

Turning now to FIGURE 3, a partial side view of the valve locking apparatus is shown, illustrating the relative location of guide rod receiving ports 29 and 29a, together with bracket 69 on bracket 31.

The inventive apparatus functions as follows, and in this connection attention is invited back to FIGURE 1. When normal line pressure of say 50 p.s.i.g. is supplied through conduit 51, this pressure is conducted via conduit 52 to diaphragm chamber 56 in the valve locking apparatus. This pressure is adequate to overcome the force of spring 63 and hold yoke member 22 away from collar 18. So long as the supply air pressure exceeds a predetermined amount, say 20 p.s.i.g., yoke member 22 remains away from collar 18 and permits free movement of valve stem 17.

With an adequate controller air supply in conduit 51, controller 46 is able to deliver its usual 3–15 p.s.i.g. control air supply to diaphragm chamber 36. Thus, diaphragm 34 is able to position stem 17 in whatever position is called for by controller 46.

However, should a failure occur in the controller air pressure supply, the pressure in conduit 51 would commence to drop below the said 20 p.s.i.g. When this occurs, spring 63 forces yoke member 22 to engage and thereby lock collar 18 in the position which stem 17 is then assuming. It will be noted that this action occurs before controller 46 is deprived of sufficient air for proper activation of diaphragm 34. Thus, when no air is supplied to diaphragm chamber 36 as a result of the air failure, even though spring 41 would normally tend to extend stem 17 into valve body 11, this extension is prevented by means of the locking action of yoke 22. Thus the control valve has truly "failed safe."

Upon resumption of air pressure to conduit 51, sufficient pressure becomes available to properly activate diaphragm 34. When the air pressure to controller 46 exceeds 20 p.s.i.g., and hence when the control valve is properly activated, pressure is transmitted via conduit 52 to disengage yoke member 22 from collar 18. This frees stem 17 for proper operation and the control valve is hence properly on-stream. It is particularly noted that the attention of operating personnel is unnecessary during this air failure, and hence completely automatic plant operation is facilitated.

While the invention has been described and illustrated in conjunction with one specific type of variable port control valve, it is evident that this description is by way of example only. Accordingly, modifications and alternatives will be apparent in light of our description, and it is thus intended to embrace all such modifications and variations as come within the spirit and broad scope of the intended invention.

We claim:

For a fluid-operated control valve, having a body containing a valve plug, a diaphragm chamber, a diaphragm for said chamber variably positioned by fluid pressure from a controller, a first spring opposing said pressure and urging said diaphragm in one direction, a valve stem attached to said diahpragm and operating said valve plug, and a pair of legs rigidly positioning said diaphragm chamber with respect to said valve body, a valve stem locking apparatus which comprises: a toothed cylindrical collar carried by said valve stem; a slideable toothed yoke adapted to engage said cylindrical collar and prevent movement of said valve stem; a pair of guide rods carrying said yoke, one rod on each side of the valve stem; a pair of brackets each having guide-rod-receiving ports therein and adapted for attachment to the pair of legs; a second diaphragm chamber carried by one of said brackets; a second diaphragm for said second diaphragm chamber connected to said slideable toothed yoke and operated by fluid pressure supplied to the controller for the said control valve; and a second spring opposing the fluid pressure supplied to said second diaphragm and urging said slideable toothed yoke into engagement with the toothed cylindrical collar on said valve stem, whereby failure of controller operating fluid locks the control valve stem in its pre-failure position.

References Cited in the file of this patent

UNITED STATES PATENTS

| | | |
|---|---|---|
| 1,887,878 | Smith | Nov. 15, 1932 |
| 2,339,469 | Emanuel | Jan. 18, 1944 |
| 2,479,454 | Annin | Aug. 16, 1949 |